(12) United States Patent
Lautenschlaeger et al.

(10) Patent No.: US 10,873,113 B2
(45) Date of Patent: Dec. 22, 2020

(54) METHOD FOR CONTROLLING THE TEMPERATURE OF AN ELECTROCHEMICAL ENERGY STORAGE SYSTEM

(71) Applicant: Robert Bosch GmbH, Stuttgart (DE)

(72) Inventors: Alexander Lautenschlaeger, Beilstein (DE); Federico Brivio, Stuttgart (DE); Jens Koerner, Bretzfeld-Scheppach (CH); Klaus-Juergen Schuler, Leingarten (DE); Xuwen Li, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 15/942,990

(22) Filed: Apr. 2, 2018

(65) Prior Publication Data

US 2018/0287229 A1  Oct. 4, 2018

(30) Foreign Application Priority Data

Apr. 3, 2017  (DE) .................. 10 2017 205 602

(51) Int. Cl.
| | | |
|---|---|---|
| *H01M 10/633* | (2014.01) | |
| *H01M 10/617* | (2014.01) | |
| *B60L 58/26* | (2019.01) | |
| *B60L 58/21* | (2019.01) | |
| *H01M 10/625* | (2014.01) | |
| *B60L 58/27* | (2019.01) | |
| *H01M 10/663* | (2014.01) | |
| *H01M 10/6563* | (2014.01) | |
| *H01M 10/48* | (2006.01) | |

(52) U.S. Cl.
CPC ........... *H01M 10/633* (2015.04); *B60L 58/21* (2019.02); *B60L 58/26* (2019.02); *B60L 58/27* (2019.02); *H01M 10/486* (2013.01); *H01M 10/617* (2015.04); *H01M 10/625* (2015.04); *H01M 10/6563* (2015.04); *H01M 10/663* (2015.04); *B60L 2240/545* (2013.01)

(58) Field of Classification Search
None
See application file for complete search history.

(56) References Cited

U.S. PATENT DOCUMENTS

| | | | | |
|---|---|---|---|---|
| 9,531,046 | B2 * | 12/2016 | Inoue ................ | H01M 10/6566 |
| 9,722,286 | B2 * | 8/2017 | Smith ................ | H01M 10/635 |
| 2013/0280564 | A1 * | 10/2013 | Zheng ................ | H01M 2/1077 |
| | | | | 429/62 |
| 2015/0380785 | A1 * | 12/2015 | Takeuchi .......... | H01M 10/6563 |
| | | | | 429/62 |
| 2016/0085247 | A1 * | 3/2016 | Smith ................ | H01M 10/486 |
| | | | | 700/300 |
| 2017/0008375 | A1 * | 1/2017 | Blatchley ............ | H01M 10/625 |
| 2017/0358833 | A1 * | 12/2017 | Jalilevand .......... | H01M 10/625 |
| 2019/0003904 | A1 * | 1/2019 | Fagart ............... | H01M 10/6563 |

\* cited by examiner

*Primary Examiner* — Scott J. Chmielecki
(74) *Attorney, Agent, or Firm* — Michael Best & Friedrich LLP

(57) ABSTRACT

Method for controlling the temperature of an electrochemical energy storage system (100), wherein the energy storage system (100) comprises at least two electrochemical energy stores (101, 102) and an air-conditioning apparatus (114) having an air-conditioning circuit (115) for air-conditioning the energy store (101, 102).

8 Claims, 4 Drawing Sheets

Temperature T1 [°C]

| | -20.00 | -10.00 | 0.00 | 10.00 | 20.00 | 30.00 | 40.00 | 50.00 |
|---|---|---|---|---|---|---|---|---|
| -20.00 | T+++ | T+++ | T+++ | T+++ | T+++ | Tc | T--- | T--- |
| -10.00 | T+++ | T+++ | T+++ | T+++ | T+++ | Tc | T--- | T--- |
| 0.00 | T+++ | T+++ | T++ | T++ | T++ | Tc | T--- | T--- |
| 10.00 | T+++ | T+++ | T++ | T+ | T+ | Tc | T--- | T--- |
| 20.00 | T+++ | T+++ | T++ | T+ | S0 | T- | T--- | T--- |
| 30.00 | Tc | Tc | Tc | Tc | T- | T- | T--- | T--- |
| 40.00 | T--- | T--- | T--- | T--- | T--- | T--- | T--- | T--- |
| 50.00 | T--- | T--- | T--- | T--- | T--- | T--- | T--- | T--- |

Table 1

Fig. 4

METHOD FOR CONTROLLING THE TEMPERATURE OF AN ELECTROCHEMICAL ENERGY STORAGE SYSTEM

BACKGROUND OF THE INVENTION

The invention is based on a method for controlling the temperature of an electrochemical energy storage system, an electrochemical energy storage system, and a use of the electrochemical energy storage system.

The prior art discloses methods for controlling the temperature of an electrochemical energy storage system having two electrochemical energy stores and air-conditioning apparatuses for air-conditioning the energy stores.

SUMMARY OF THE INVENTION

In contrast, the procedure according to the invention has the advantage that a first temperature and/or a first temperature control requirement of the first electrochemical energy store is/are captured, a second temperature and/or a second temperature control requirement of the second electrochemical energy store is/are captured, and the air-conditioning apparatus is controlled on the basis of the first temperature, the second temperature, the first temperature control requirement and/or the second temperature control requirement.

Controlling the air-conditioning apparatus on the basis of the first captured temperature and the second captured temperature, for example by means of temperature sensors of the first electrochemical energy store and/or of the second electrochemical energy store, makes it possible to react more quickly to temperature changes, for example caused by increased environmental conditions, solar radiation or waste heat, in comparison with the prior art.

The air-conditioning apparatus can be controlled on the basis of the first captured temperature control requirement and/or the second captured temperature control requirement, for example if the first electrochemical energy store or the second electrochemical energy store determines a temperature control requirement on the basis of dedicated temperature sensors and transmits this requirement to a control device of the electrochemical energy storage system by means of a bus system, for example a CAN bus.

The air-conditioning apparatus is advantageously controlled in such a manner that the energy stores are heated by means of the air-conditioning circuit if the first temperature and the second temperature are in a first temperature range or if one of the two temperature control requirements comprises a heating operation and the other of the two temperature control requirements comprises a heating operation and/or circulation, or no further temperature requirement is captured.

This makes it possible to heat the two energy stores at low temperatures, in particular, in which case a different heating intensity can be selected on the basis of the captured temperatures and/or the captured temperature control requirements.

The air-conditioning apparatus is advantageously controlled in such a manner that the energy stores are cooled by means of the air-conditioning circuit if the first temperature and the second temperature are in a second temperature range or if one of the two temperature control requirements comprises a cooling operation and the other of the two temperature control requirements comprises a cooling operation and/or circulation, or no further temperature control requirement is captured.

This makes it possible to effectively cool the energy stores at high temperatures, in particular, in which case a different cooling power can be selected on the basis of the captured temperatures and/or the captured temperature control requirements.

The air-conditioning apparatus is advantageously controlled in such a manner that the air-conditioning circuit is circulated if the first temperature and the second temperature are in a third temperature range or if the first temperature control requirement comprises a cooling operation and the second temperature control requirement comprises a heating operation, or if the first temperature control requirement comprises a heating operation and the second temperature control requirement comprises a cooling operation.

As a result, a high temperature of one of the two energy stores can be advantageously used to heat the other energy store. Alternatively, a low temperature of one of the two energy stores can be used to cool the other energy store.

A circulation direction of the air-conditioning circuit is advantageously stipulated, in particular, on the basis of the first temperature and the second temperature and/or the first temperature control requirement and/or the second temperature control requirement.

This makes it possible to effectively use a temperature difference between the two energy stores. The air-conditioning circuit, which is connected to the two energy stores and to a compressor, for example, in a thermally conductive manner, can therefore be used to transport an excess amount of heat from one of the two energy stores to the other of the two energy stores in such a manner that no additional heat losses are produced via the air-conditioning circuit and/or air-conditioning compressor.

The air-conditioning apparatus is advantageously switched off if the first temperature and the second temperature are in a fourth temperature range, or if no temperature control requirement is captured.

This makes it possible to save energy since the air-conditioning apparatus is switched off in the fourth temperature range and therefore does not consume any energy, thus increasing a service life and/or range of the electrochemical energy storage system, for example.

This makes it possible to control the temperature of the at least two electrochemical energy stores with little outlay on components.

The electrochemical energy storage system comprises at least one lithium ion, lithium sulfur, lithium air and/or lithium polymer cell, a nickel metal hydride and/or lead acid battery, a capacitor and/or a solid electrolyte battery.

This makes it possible to use the method according to the invention to control the temperature of an electrochemical storage system for a multiplicity of electrochemical energy stores.

The control device advantageously communicates with the at least one temperature sensor and/or with the air-conditioning apparatus in a wired and/or wireless manner.

This makes it possible to flexibly arrange the temperature sensor and the air-conditioning apparatus and the control device. Furthermore, it is possible to reduce a number of components since wiring is dispensed with.

In one embodiment with wired communication, carrier frequency technology, for example Powerline communication, can be advantageously effected using existing electrical cables.

In another embodiment, communication is effected via a radio network, for example according to the standards IEEE 802.11 and/or IEEE 802.15. The transmitted data are advantageously encrypted, thus making manipulation more difficult.

The electrochemical energy storage system according to the invention is advantageously used in electric vehicles, hybrid vehicles, plug-in hybrid vehicles, pedelecs or E-bikes, for portable telecommunications or data processing devices, for electrical hand tools or food processors, and in stationary memories for storing regeneratively obtained electrical energy, in particular.

BRIEF DESCRIPTION OF THE DRAWINGS

Exemplary embodiments of the invention are illustrated in the drawing and are explained in more detail in the following description.

In the drawing:

FIG. 4 shows a table summarizing details of temperature control requirement types of FIG. 3 in a permissible temperature range of −20 degrees Celsius to +50 degrees Celsius.

DETAILED DESCRIPTION

Identical reference symbols denote identical apparatus components in all figures.

Figure 1:
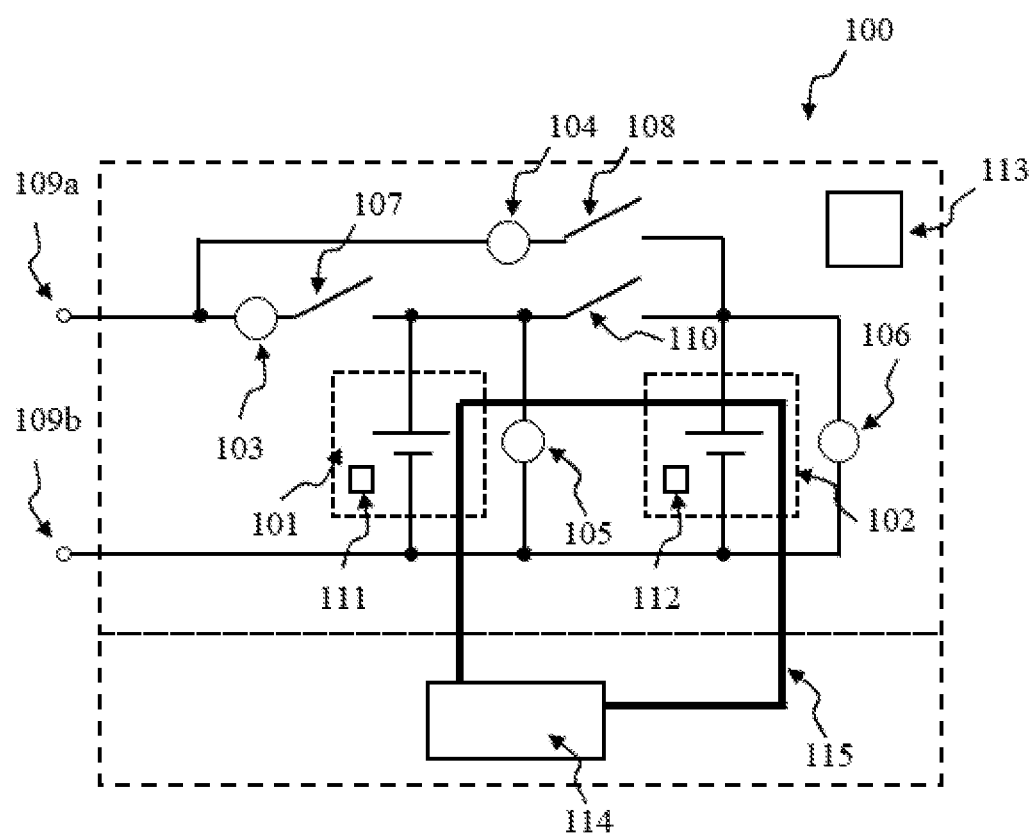
FIG. 1 shows a block diagram of a first embodiment of an electrochemical energy storage system according to the invention.

FIG. 1 shows a block diagram of a first embodiment of an electrochemical energy storage system according to the invention. The electrochemical energy storage system 100 according to the invention comprises a first electrochemical energy store 101, a second electrochemical energy store 102, a first current sensor 103, a second current sensor 104, a first voltage sensor 105, a second voltage sensor 106, a first switch 107, a second switch 108 and a third switch 110 for connecting and/or disconnecting the first and/or second energy store 101, 102 to/from electrical connection poles 109a, 109b of the energy storage system 100, a first temperature sensor 111 for capturing a first temperature and/or for determining a first temperature control requirement of the first electrochemical energy store 101, a second temperature sensor 112 capturing a temperature and/or for determining a second temperature control requirement of the second electrochemical energy store 102, a control device 113 and an air-conditioning apparatus 114 having an air-conditioning circuit 115 which is connected both to the first energy store 101 and to the second energy store 102 in a thermally conductive manner.

In the first embodiment illustrated, the temperature of the first energy store 101 and of the second energy store 102 is controlled by means of the air-conditioning apparatus 114 via the common air-conditioning circuit 115.

In this first embodiment, the energy stores 101, 102 also capture the temperature by means of the temperature sensors 111, 112 and transmit this temperature to the control device 113, for example by means of a bus system, and/or determine a temperature control requirement, which is captured by the control device 113, from the temperatures captured by means of the dedicated temperature sensors 111, 112.

Figure 2:
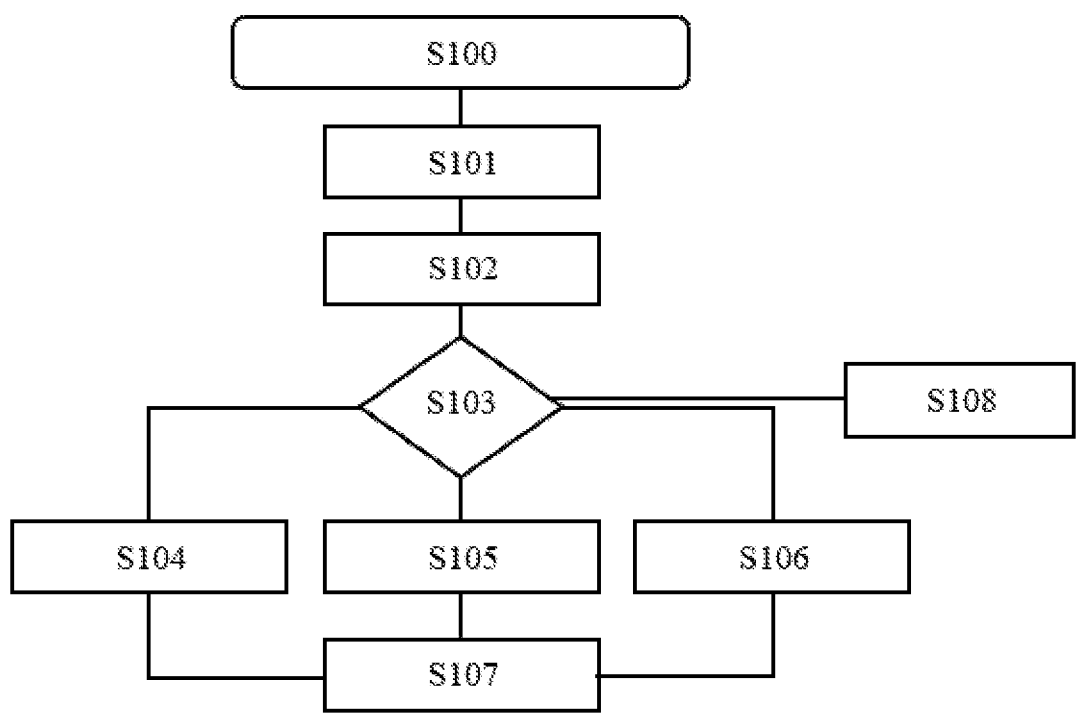
FIG. 2 shows a flowchart of a first embodiment of a method according to the invention for controlling the temperature of an electrochemical energy storage system.

FIG. 2 shows a flowchart of a first embodiment of a method according to the invention for controlling the temperature of an electrochemical energy storage system. The method is started in step S100, for example when the electrochemical energy storage system 100 is activated. In a first step S101, a first temperature T1 and/or a first temperature control requirement of the first electrochemical energy store 101 is/are captured.

In a second step S102, a second temperature T2 and/or a second temperature control requirement of the second electrochemical energy store 102 is/are captured.

A step S103 stipulates what type of control of the air-conditioning apparatus 114 is selected on the basis of the first temperature T1, the second temperature T2, the first temperature control requirement and/or the second temperature control requirement.

In a step S104, the air-conditioning apparatus 114 is therefore controlled to heat the energy stores 101, 102 by means of an air-conditioning circuit 115 if the first temperature T1 and the second temperature T2 are in a first temperature range or if one of the two temperature control requirements comprises a heating operation and the other of the two temperature control requirements comprises a heating operation and/or circulation, or no further temperature control requirement is captured.

In a step S105, the air-conditioning apparatus 114 is controlled to cool the energy stores 101, 102 by means of the air-conditioning circuit 115 if the first temperature T1 and the second temperature T2 are in a second temperature range or if one of the two temperature control requirements comprises a cooling operation and the other of the two temperature control requirements comprises a cooling operation and/or circulation, or no further temperature control requirement is captured.

In a step S106, the air-conditioning apparatus is controlled to circulate the air-conditioning circuit 115 if the first temperature T1 and the second temperature T2 are in a third temperature range or the first temperature control requirement comprises a cooling operation and the second temperature control requirement comprises a heating operation, or if the first temperature control requirement comprises a heating operation and the second temperature control requirement comprises a cooling operation.

After one of the steps S104, S105, S106 has been carried out, a step S107 stipulates a circulation direction of the air-conditioning circuit.

Alternatively, the air-conditioning apparatus is switched off in a step S108 if the first temperature T1 and the second temperature T2 are in a fourth temperature range, or if no temperature control requirement is captured.

The air-conditioning apparatus is designed such that a temperature of the temperature control circuit can be increased and/or reduced in a stepless and/or step-like manner.

Stepless and/or step-like adaptation of a circulation direction and/or circulation speed is also possible, as a result of which temperature peaks, in particular, can be quickly intercepted in comparison with the prior art.

Figure 3:
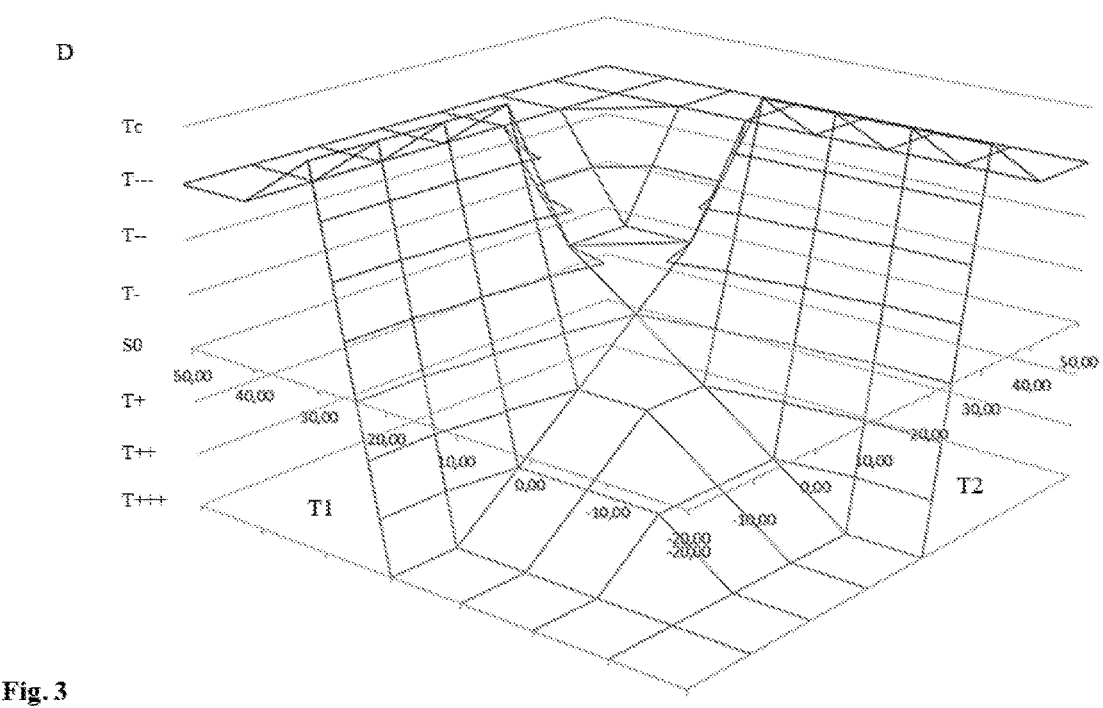
FIG. 3 shows a diagram for illustrating a calculation method according to the invention for a temperature control requirement on the basis of two temperatures.

FIG. 3 shows a diagram for illustrating a calculation method according to the invention for a temperature control requirement on the basis of two temperatures.

A temperature T1 of a first electrochemical energy store 101 is plotted on a first axis and a temperature T2 of a second electrochemical energy store 102 is plotted on a second axis.

A temperature control requirement D is plotted on a third axis.

The temperature control requirement D comprises different types of temperature control requirements T+++, T++, T+, S0, T−, T−−, T−−−, Tc.

The temperature control requirement types T+, T++, T+++ represent a required heating power intensity; for example, a maximum heating power will be set with the temperature control requirement type T+++, an average heating power will be set with T++ and a low heating power will be set with T+.

The temperature control requirement types T−, T−−, T−−− represent a required cooling power intensity; for example, a maximum cooling power can be set with the temperature control requirement type T−−−, an average cooling power can be set with T−− and a low cooling power can be set with T−.

The temperature control apparatus 114 is at least temporarily switched off with the temperature control requirement type S0.

Furthermore, the temperature control apparatus 114 is caused to circulate with the temperature control requirement type Tc, during which an excess amount of heat is transported from one energy store 101, 102 to the other energy store 101, 102, in which case a circulation direction of the temperature control circuit can also be stipulated therein, for example.

Further details of the temperature control requirements in a permissible temperature range of −20 degrees Celsius to +50 degrees Celsius are summarized in FIG. 4.

The invention claimed is:

1. A method for controlling the temperature of an electrochemical energy storage system (100), wherein the energy storage system (100) has a first electrochemical energy store (101) and a second electrochemical energy store (102), a first temperature sensor, a second temperature sensor, a controller, and an air-conditioning apparatus (114) having an air-conditioning circuit (115) for air-conditioning the first and second energy stores (101, 102), the method comprising:
   (S101) capturing, via the first temperature sensor, a first temperature (T1)-of the first electrochemical energy store (101);
   (S102) capturing, via the second temperature sensor, a second temperature (T2) of the second electrochemical energy store (102);
   determining a temperature control requirement according to the first temperature (T1) and the second temperature (T2); and
   (S103) heating the second electrochemical energy store (102) using an excess amount of heat of the first electrochemical energy store (101) by operating the air-conditioning apparatus (114) according to the temperature control requirement.

2. The method according to claim 1, further comprising:
   (S104) controlling the air-conditioning apparatus (114) to heat (T+++, T++, T+) the first and second energy stores (101, 102) by the air-conditioning circuit (115) if the first temperature (T1) and the second temperature (T2) are in a first temperature range.

3. The method according to claim 1, further comprising:
   (S105) controlling the air-conditioning apparatus (114) to cool (T−−−, T−−, T−) the energy stores (100, 101) by the air-conditioning circuit (115) when the first temperature (T1) and the second temperature (T2) are in a second temperature range.

4. The method according to claim 1, further comprising:
   (S106) controlling the air-conditioning apparatus (114) to circulate (Tc) the air-conditioning circuit (115) if the first temperature (T1) and the second temperature (T2) are in a third temperature range.

5. The method according to claim 1, further comprising:
   (S107) stipulating a circulation direction and/or a circulation speed of the air-conditioning circuit (115).

6. The method according to claim 1, further comprising:
   (S108) switching off (S0) the air-conditioning apparatus (114) when the first temperature (T1) and the second temperature (T2) are in a fourth temperature range, or if no temperature control requirement is captured.

7. The electrochemical energy storage system (100) according to claim 1, wherein at least one of the electrochemical energy stores (101, 102) comprises at least one lithium ion, lithium sulfur, lithium air and/or lithium polymer cell, a nickel metal hydride and/or lead acid battery, a capacitor and/or a solid electrolyte battery.

8. An electrochemical energy storage system comprising:
   a first electrochemical energy store;
   a second electrochemical energy store;
   a first temperature sensor;
   a second temperature sensor;
   an air-conditioning apparatus having an air-conditioning circuit for air-conditioning the first and second energy stores;
   and a controller programmed to capture, via the first temperature sensor, a first temperature of the first electrochemical energy store;
   capture, via the second temperature sensor, a second temperature of the second electrochemical energy store;
   determine a temperature control requirement according to the first temperature and the second temperature; and
   heat the second electrochemical energy store using an excess amount of heat of the first electrochemical energy store by operating the air-conditioning apparatus according to the temperature control requirement.

* * * * *